(No Model.) 2 Sheets—Sheet 1.
O. A. ENHOLM.
CONDUIT ELECTRIC RAILWAY SYSTEM.
No. 525,539. Patented Sept. 4, 1894.
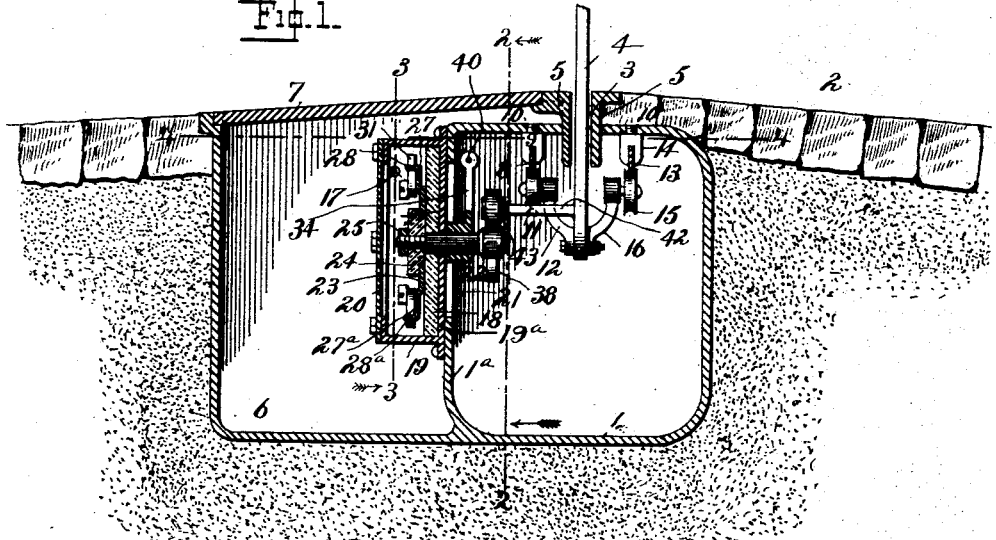
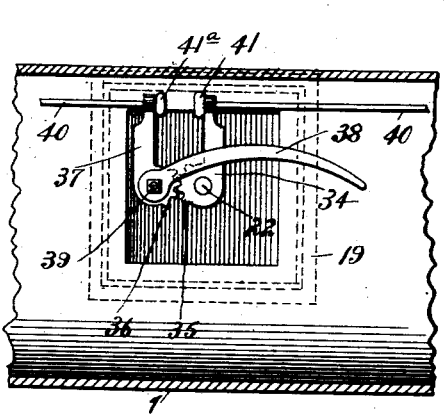
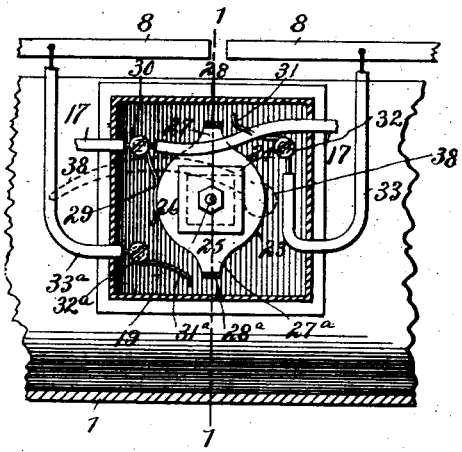
Witnesses
Geo. Whayler Jr.
M. V. Bidgood
Inventor
Oscar A. Enholm
by his attys

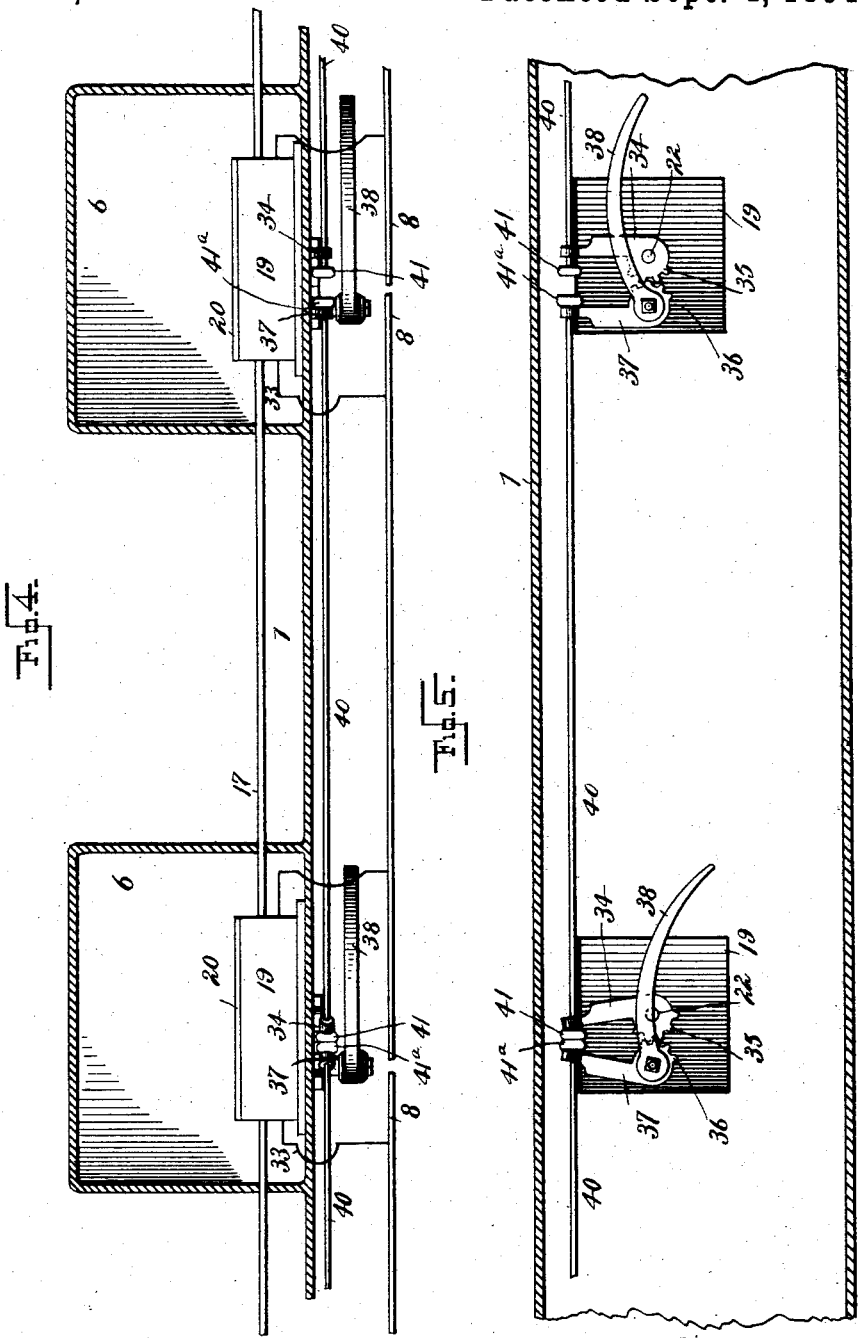

UNITED STATES PATENT OFFICE.

OSCAR A. ENHOLM, OF NEW YORK, N. Y., ASSIGNOR TO W. DEAN SMITH, OF SAME PLACE.

CONDUIT ELECTRIC-RAILWAY SYSTEM.

SPECIFICATION forming part of Letters Patent No. 525,539, dated September 4, 1894.

Application filed April 17, 1894. Serial No. 507,841. (No model.)

*To all whom it may concern:*

Be it known that I, OSCAR A. ENHOLM, a citizen of the United States, residing at New York, county and State of New York, have invented certain new and useful Improvements in Underground Electric Railways, of which the following is a specification.

My invention relates to the class of electric railway conduit systems wherein a main conductor is connected with a series of separate or insulated sections that are successively brought into electrical connection with said main conductor or circuit by the passage of a car or motor, and my improvements pertain to novel means for making successive electrical connection between said sections and the main conductor or circuit.

In carrying out my invention I provide a main feed conductor or circuit and a series of separate or insulated sections or conductors upon which the trolley wheels or contacts carried by a car are arranged to bear, each of which sections are connected with a switch mechanism whereby said sections are normally out of circuit with the main conductor. The successive switch mechanisms are connected together by devices so arranged that the passage of a car, while causing one switch to turn to bring the corresponding conductor section into circuit with the main conductor, operates the switch of a preceding section to throw it out of circuit therewith, so that only two sections will be in circuit with the main conductor at a time. These devices are located in a conduit beneath the surface of a roadbed, and the switch mechanisms are located near the ends of the conductor sections.

The invention further consists in the novel details of improvement and the combinations of parts that will be more fully hereinafter set forth, and then pointed out in the claims.

Reference is to be had to the accompanying drawings forming part hereof, wherein—

Figure 1 is a vertical cross section, on the plane of the line 1, 1 in Fig. 3, showing my improvements in position in the conduit. Fig. 2 is a longitudinal section through the conduit on the plane of the line 2, 2 in Fig. 1, looking in the direction of the arrow 2. Fig. 3 is a similar view on the plane of the line 3, 3 in Fig. 1, looking in the direction of the arrow 3. Fig. 4 is a horizontal longitudinal section on the plane of the line 4, 4 in Fig. 1, and Fig. 5 is a vertical longitudinal section on the plane of the line 2, 2 in Fig. 1.

Referring now to the accompanying drawings, in which similar numerals of reference indicate corresponding parts in the several views, the numeral 1, indicates a suitable conduit located beneath the roadbed 2. The conduit 1 is provided with a longitudinal slot 3 for the passage of a plow 4 that depends from a car (not shown) which may be provided with any suitable electric motor for propelling it.

5, 5 are longitudinal wear or rib plates shown projecting through the slot 3.

6 are manholes or compartments connected with the side of the conduit 1, and located at suitable distances apart, say every twenty feet, and provided with covers 7, to permit access to the switch mechanisms hereinafter explained.

8, 8 are sections of an auxiliary conductor, shown in the form of flat bars, carried by insulated hangers 9, depending from the top 10 of the conduit 1. The sections 8, 8, may be separated by space, or by any desired insulation, so that they will normally be out of electrical contact, and they are arranged end to end longitudinally of the conduit 1. (See Fig. 4.)

11 is a trolley wheel or contact that is carried by a bracket 12 on the arm 4, and normally in contact with the trolley sections 8, 8 so as to lead current therefrom to the car motor.

13 is a continuous conductor or rail carried by insulated hangers 14 depending from the top of the conduit 1, the conductor 13 being engaged by a trolley roller or contact 15 on a bracket 16 on the arm 4, and insulated from the bracket 12, to carry the return or negative current.

Within the compartments or manholes 6, and carried by the vertical wall 1ª of the conduit 1, is my improved switch mechanism for making electrical connection between the conductor sections 8, 8 and the main conductor 17. This switch mechanism is organized as follows.

18 is a plate of insulating material, say rubber or fiber, secured on the wall 19ª, within the compartment 6.

The box 19, has a removable cover or side 20 to permit access to the contained mechanism. The box 19 registers with an opening 21 in the wall 1ª.

22 is a rock shaft journaled in the side 19ª of the box 19 and in the insulation 18, and 23 is a contact plate carried by the shaft 22 to be turned thereby. The plate 23 is insulated from the shaft 22, as by insulation 24 carried by said shaft and held thereto by a nut 25. As shown in Fig. 3 the contact 23 is curved or circular at 26; and has diametrically opposite projecting wings 27, 27ª that are preferably turned outwardly at 28, 28ª. (See Fig. 1.)

29 is a spring contact normally in engagement with the plate 23 at 26, and connected to a binding post 30, to which the main conductor 17 is connected, as in Fig. 3. The conductor 17 is similarly connected with all the boxes 19 in the system.

31 is a spring contact connected with a binding post 32 which leads by a wire 33 to one end of a section 8 of the auxiliary conductor. 31ª is a similar spring contact connected with a binding post 32ª from which extends a wire 33ª to another conductor section 8. When the contact plate 23 is turned the parts 28 and 28ª make electrical connection with the contacts 31 and 31ª respectively.

The plate 23 is to be turned to make electrical connection between the conductors 8 and 17, as above stated, by the passing car, and for this purpose I secure on the shaft 22 a crank or arm 34, that is provided with segmental gears 35, which mesh with similar gears 36 carried by an arm 37 journaled on the box 19.

38 is a curved arm or lever connected to the crank or lever 37, or to its pivot 39, whereby when the crank or lever 38 is depressed the gears 35 and 36 will cause the two cranks or arms 34 and 37 to approach, as at the left in Fig. 5, and when the lever 38 is raised said cranks will separate as at the right in Fig. 5 and in Fig. 2.

The crank or arm 34 of box 20, and the crank or arm 37 of the next box are connected together by a rod 40 as in Fig. 5, and so on throughout the series. The rods 40 have heads or enlargements 41, 41ª at their ends and said rods 40 pass freely through suitable apertures in the ends of the cranks 34 and 37. In their normal positions the enlargement or head 41 on a rod 40 and the end of the crank or rod 34 are separated a short distance as in Fig. 5 to permit said crank to have a slight independent movement without pulling its rod 40.

42 is a bar or arm projecting from the arm 4 and carrying a friction roller 43 to bear on the levers 38 to depress them successively as in Fig. 1.

The operation is as follows:—In the normal positions the parts 28 and 28ª of contact plate 23 are out of contact with the contacts 31 and 31ª as in Fig. 3, and there is no current in the respective conductor sections 8, 8. When a car reaches a box 19 the roller 43 depresses the lever 38, which acts to move the crank arm 34 and 37 together as in Fig. 5, at the left hand side, whereupon the shaft 22 will be rocked to turn the plate 23. The parts 28 and 28ª will now engage the contacts 31 and 31ª thus closing the circuit from the main conductor 17 through 30, 29, 26, 23, 28, 31, 32, and 33 to one conductor section 8, and also through 28ª, 31ª, 32ª and 33ª to the other section 8 whereby the trolley 11 will take current from the section 8 it may happen to be in contact with, and thus supply the motor on the car with current. When the car reaches the next box 20 it will depress the corresponding lever 38, whereupon the corresponding cranks 34, and 27, will approach to close the circuit in the box 19 as before stated. This movement of the crank 34 will draw its corresponding rod 40 longitudinally whereupon its head 41ª will act to turn the crank 37 of the previously passed box 19 to disconnect the respective contacts 28, 31 and 28ª and 31ª of that box, so that the corresponding conductor sections 8, 8 will thereupon be cut out from the main line. The independent initial movement of the crank 34 before it engages the head 41 of its rod 40 prevents the rod 40 from engaging crank 27 by pulling it too far and allows contact to be made at 28 and 31 in the corresponding box 19 before the section 8 is cut out at the preceding box 19, so that while a car is over a section 8 the latter will always be supplied with current. Thus it will be seen that as the car passes from box to box contact will be made in one box and disconnection made in the preceding box, between the main conductor and the auxiliary sections 8, 8 so that not more than two sections 8, 8 will be supplied with current at a time. The object of supplying two sections with current at the same time is to allow the car if so desired, to be reversed and run backward. The independent movement of the rods 40 in their respective crank arms 34 and 37 permits proper to-and-fro action of said rods as they are operated by their respective cranks. It will also be understood that the depression of one lever 38 causes the restoring of the preceding lever and its connected parts, which will not occur until such time as the car reaches another box, so that if a car stops between the boxes there will be no danger of its becoming "stalled" on account of a lever 38 acting spontaneously to break the circuit in a section 8, this only being accomplished when a car reaches another box 19. The make and break of the circuit in the boxes is entirely automatic, being governed by the passage of a car over a switch box 19. This improved system is entirely safe as only the sections 8, 8 immediately beneath a car are in electrical connection, with the main conductor, the latter being thoroughly insulated from the earth and having no connection therewith.

Having thus described my invention, what

I claim as new therein, and desire to secure by Letters Patent, is—

1. An underground electric railway system comprising a main conductor, an auxiliary conductor composed of separate or insulated sections, switch mechanism for connecting said sections successively with the main conductor, and positive mechanism connecting said switch mechanisms together so that the operation of one switch to close the circuit from the main conductor to an auxiliary conductor section will mechanically operate to cut out another of said sections from circuit with the main conductor, substantially as described.

2. An underground electric railway system, comprising a main conductor, an auxiliary conductor composed of separate or insulated sections, switch mechanisms for connecting said sections with said main conductor, said switch mechanisms comprising contacts connected with the conductor sections, a contact connected with the main conductor, a movable contact for closing the circuit between the main conductor, and two conductor sections, a crank or arm connected with said movable contact, another crank or arm operated conjointly with the first mentioned crank or arm, a lever or arm for actuating said cranks, and rods connecting the opposing cranks of succeeding switch mechanisms whereby when one switch is operated to close the circuit, another switch will be operated to break the circuit through it, substantially as set forth.

3. An underground electric railway system comprising a main conductor an auxiliary conductor composed of separate or insulated sections, with mechanisms for connecting said sections with said main conductor, said switch mechanisms comprising contacts connected with the conductor sections, a contact connected with the main conductor, a rotative contact normally in circuit with the main conductor and having portions to engage the contacts of the conductor sections, a crank or arm connected with said rotative contact, another crank or arm and gearing between said crank or arms whereby they operate to approach and recede from each other conjointly and rods connected with the opposing cranks of the successive switch mechanisms, said rods having movable connection with said cranks or arms, the cranks connected with the contact plates having independent motion with respect to its connected rod to permit it to move a certain distance before actuating its respective rod, substantially as and for the purposes specified.

4. An underground electric railway system comprising a conduit an auxiliary conductor consisting of separate or insulated sections carried within said conduit compartments or manholes located at suitable distances apart and connected with the side of said conduit, switch mechanisms located within said compartments or manholes, and comprising a movable contact having a rock shaft projecting into said conduit, said rock shaft carrying a lever or arm for engagement with a trolley wheel or roller, a main conductor having a branch contact for said switch mechanism in normal engagement with said movable contact, a separate contact for each switch mechanism connected with said adjoining conductor sections, a crank or arms connected with each movable conductor, a separate arm for each switch mechanism and gearing between each pair of said cranks or arms, and rods or connections connecting the opposing cranks or arms of the successive switch mechanisms, all arranged for operation, substantially as set forth.

5. A switch mechanism comprising a movable contact a contact 29 in normal engagement therewith, contacts 31 and 32 normally out of engagement therewith, the movable contact having portions adapted to engage the contacts 31, and 31$^a$ a crank or arm connected with said movable contact, a separate crank or arm and devices for causing joint operation of said cranks or arms to move them toward and from each other as and for the purposes specified.

6. A switch mechanism comprising a box 19, an insulating plate 18 carried thereby, a rock shaft 22, a contact carried thereby, a contact 29 normally in engagement therewith, contacts 31 and 31$^a$ normally out of engagement therewith, said movable contact having portions 28 and 28$^a$ to engage the contacts 31 and 31$^a$, a crank or arm 34 connected with the shaft 32 and having gears 35, a separate crank or arm having gears 36 to engage the gears 35 and a lever or arm 38 connected with the crank 37 whereby said cranks or arms are operated conjointly, as and for the purposes specified.

OSCAR A. ENHOLM.

Witnesses:
J. GREEN,
M. V. BIDGOOD.